(12) United States Patent
Oh et al.

(10) Patent No.: US 8,279,898 B2
(45) Date of Patent: Oct. 2, 2012

(54) DISTANCE MEASURING METHOD

(75) Inventors: Mi Kyung Oh, Gyeongsangbuk-do (KR); Hong Soon Nam, Daejeon (KR); Jae Young Kim, Daejeon (KR); Joo Ho Park, Daejeon (KR); Hyung Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 12/549,882

(22) Filed: Aug. 28, 2009

(65) Prior Publication Data

US 2010/0157810 A1 Jun. 24, 2010

(30) Foreign Application Priority Data

Dec. 22, 2008 (KR) .................. 10-2008-0130974

(51) Int. Cl.
*H04J 3/06* (2006.01)
(52) U.S. Cl. ...................................... 370/508
(58) Field of Classification Search .......... 370/503, 370/507–510, 517–519, 252, 389, 392, 400, 370/401
See application file for complete search history.

(56) References Cited

U.S. PATENT DOCUMENTS

| 7,710,321 B2 * | 5/2010 | Heidari-Bateni et al. .... 370/252 |
| 2009/0086764 A1 * | 4/2009 | Lee et al. .................... 370/503 |
| 2009/0147806 A1 * | 6/2009 | Brueckheimer ............. 370/503 |
| 2009/0149198 A1 * | 6/2009 | Nam et al. ................. 455/456.2 |
| 2010/0135332 A1 * | 6/2010 | Siemens et al. ............. 370/503 |
| 2010/0172339 A1 * | 7/2010 | Duan et al. ................. 370/350 |

FOREIGN PATENT DOCUMENTS

KR 1020090060914 A 6/2009

OTHER PUBLICATIONS

Bin Zhen,e t al; "Clock management in Ultra-wideband Ranging" Mobile and Wireless Communications Summit 2007, pp. 1-5, 2007.

* cited by examiner

*Primary Examiner* — Kerri Rose
(74) *Attorney, Agent, or Firm* — Ladas & Parry LLP

(57) ABSTRACT

Provided is a distance and position measuring method. A distance measuring method based on packets transmitted and received between a first node and a second node obtains first timing for transmitting a first packet from the first node, second timing for receiving the first packet in the second node, third timing for transmitting a second packet corresponding to the first packet from the second node, fourth timing for receiving the second packet in the first node, fifth timing for transmitting a third packet from the second node, and sixth timing for receiving the third packet in the first node to estimate a clock frequency offset based on the obtained timings, measures a first distance and a second distance based on the clock frequency offset and some of the timings, and measures a distance between the first node and the second node based on the first distance and the second distance.

16 Claims, 10 Drawing Sheets

(Prior Art)

DISTANCE MEASURING METHOD

CROSS-REFERENCE TO RELATED APPLICATION

This application claims priority to and the benefit of Korean Patent Application No. 10-2008-0130974 filed in the Korean Intellectual Property Office on Dec. 22, 2008, the entire contents of which are incorporated herein by reference.

BACKGROUND OF THE INVENTION (a) Field of the Invention

The present invention relates to a distance measuring method. Particularly the present invention relates to a distance measuring method in an impulse-based wireless communication system.

(b) Description of the Related Art

Recently, an impulse-based wireless technology that consumes low power and has a distance estimating function has gained interest as a promising technology, such as being adopted as a physical layer technology of the Institute of Electrical and Electronics Engineers (EEE) 802.15.4a that is an international standard of a low-speed positioning wireless personal area network (WPAN).

As the impulse-based distance estimating method, there is time of arrival (hereinafter referred to as "TOA") that estimates a distance by measuring propagation transmission time between two nodes.

A one-way ranging (OWR) method that transmits messages between two synchronized nodes and a two-way ranging (TWR) method that transmits and receives messages between two asynchronized nodes can be applied to the TOA method. It is difficult to achieve network synchronization between nodes in IEEE 802.15.4a. As a result, the TWR method is adopted as a basic distance estimating method.

The TWR method has a disadvantage of being considerably affected by a clock frequency offset (hereinafter referred to as "CFO") when estimating a distance between nodes. Herein, when a difference in CFO between nodes is large, response time is long and TOA estimation error is thus increased.

In order to solve the disadvantage of the TWR method being sensitive to CFO, a symmetric double-sided TWR (SDS-TWR) method has been proposed. However, the SDS-TWR method has a problem in that in order to reduce the effect of CFO, more packets should be transmitted and received in the TWR method. Further, when the positioning is performed based on the SDS-TWR method, there is a disadvantage in that considerable load is applied to the network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a distance measuring method having advantages of precisely estimating a distance by estimating a clock frequency offset between nodes in an asynchronous network, and reducing the number of packets transmitted and received between nodes.

An exemplary embodiment of the present invention provides a distance measuring method based on packets transmitted and received between a first node and a second node, including: obtaining first timing for transmitting a first packet from the first node; obtaining second timing for receiving the first packet in the second node; obtaining third timing for transmitting a second packet corresponding to the first packet from the second node; obtaining fourth timing for receiving the second packet in the first node; obtaining fifth timing for transmitting a third packet from the second node; obtaining sixth timing for receiving the third packet in the first node; estimating a clock frequency offset based on the obtained timings; measuring a first distance based on the clock frequency offset and timings for transmitting and receiving the first packet and the second packet; measuring a second distance based on the clock frequency offset and timings for transmitting and receiving the first packet and the third packet; and measuring a distance between the first node and the second node based on the first distance and the second distance.

Another embodiment of the present invention provides a distance measuring method based on packets transmitted and received between a first node and a second node, including: obtaining first timing for transmitting a first packet from the first node; obtaining second timing for receiving the first packet in the second node; obtaining third timing for transmitting a second packet corresponding to the first packet from the second node; obtaining fourth timing for receiving the second packet in the first node; obtaining fifth timing for transmitting a third packet from the first node; obtaining sixth timing for receiving the third packet in the second node; estimating a clock frequency offset based on the obtained timings; measuring a first distance based on the clock frequency offset and timings for transmitting and receiving the first packet and the second packet; measuring a second distance based on the clock frequency offset and timings for transmitting and receiving the second packet and the third packet; and measuring a distance between the first node and the second node based on the first distance and the second distance.

Yet another embodiment of the present invention provides a distance measuring method based on packets transmitted and received between a first node and a second node, including: obtaining first timing for transmitting a first packet from the first node; obtaining second timing for receiving the first packet in the second node; obtaining third timing for transmitting a second packet corresponding to the first packet from the second node; obtaining fourth timing for receiving the second packet in the first node; obtaining fifth timing for transmitting a third packet from the second node; obtaining sixth timing for receiving the third packet in the first node; estimating a clock frequency offset based on the obtained timings; measuring a first distance based on the clock frequency offset and timings for transmitting and receiving the first packet and the third packet; measuring a second distance based on the clock frequency offset and timings for transmitting and receiving the second packet and the third packet; and measuring a distance between the first node and the second node based on the first distance and the second distance.

DETAILED DESCRIPTION OF THE EMBODIMENTS

Figure 1:
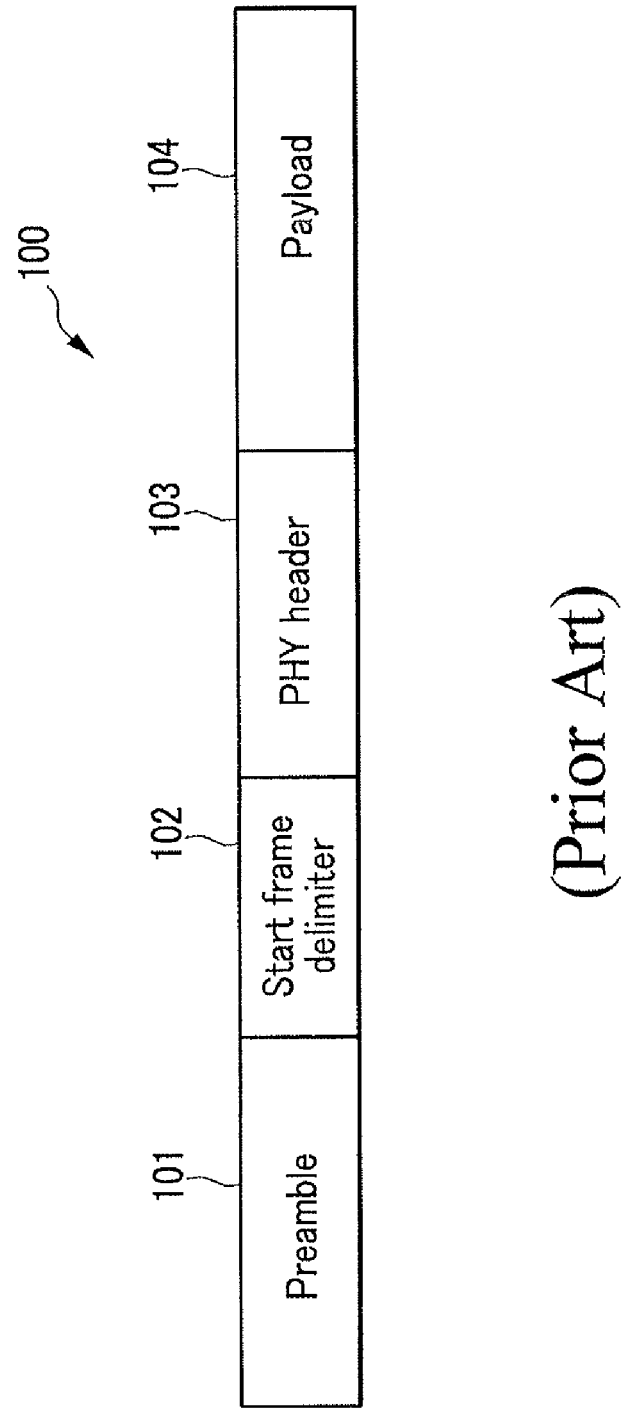
FIG. 1 is a diagram showing a structure of a frame in a general impulse-based wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a node-B may be referred to as a base station (BS), an access point (AP), a radio access station (RAS), an evolved node-B (eNB), a base transceiver station (BTS), a mobile multihop relay (MMR)-BS, etc., and may include all or some functions of the base station, the access point, the radio access station, the eNB, the base transceiver station, and the MMR-BS.

Hereinafter, a distance measuring method according to an exemplary embodiment of the present invention will be described with reference to the accompanying drawings.

Figure 2:
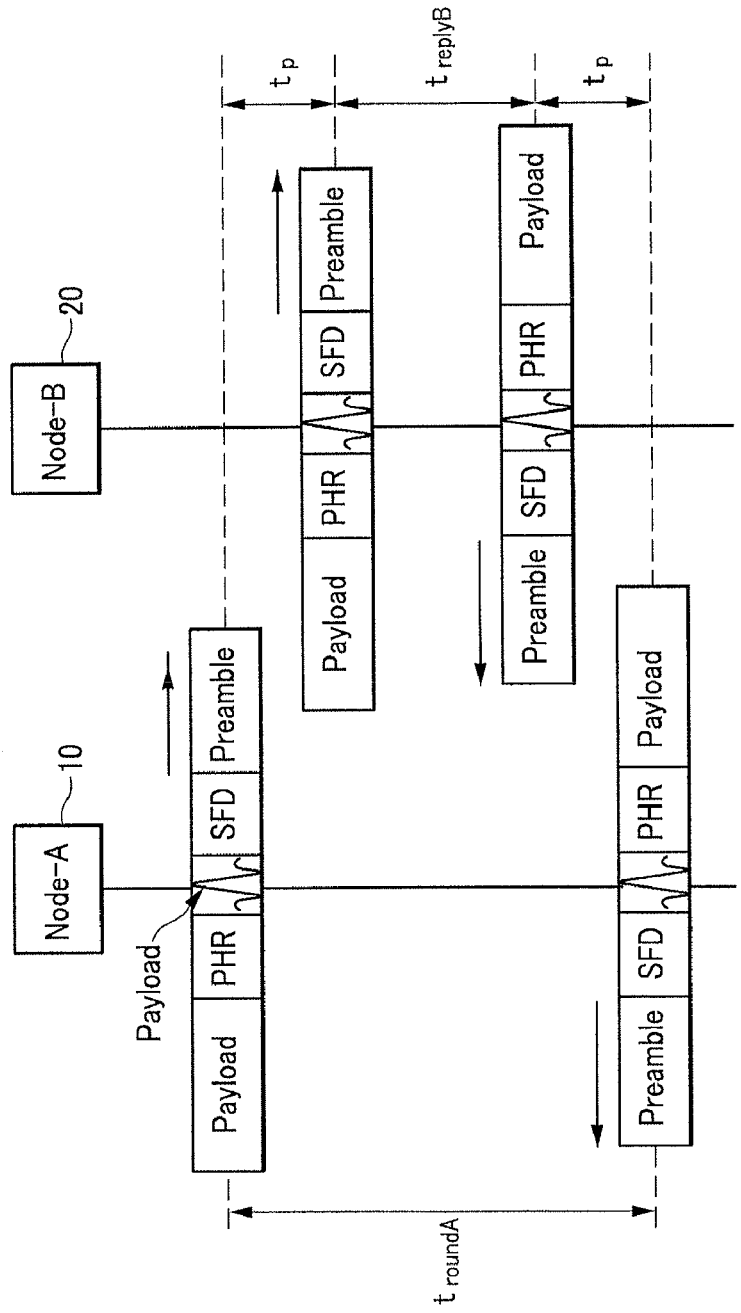
FIG. 2 is a diagram showing a two-way ranging method based on an IEEE 802.15.4a packet frame.

FIG. 1 is a diagram showing a structure of a frame in a general impulse-based wireless communication system, and FIG. 2 is a diagram showing a two-way ranging method based on an IEEE 802.15.4a packet frame.

First, the frame structure will be described with reference to a packet frame 100 for the IEEE 802.15.4a impulse as one example.

As shown in FIG. 1, the frame 100 includes a preamble 101, a start frame delimiter (hereinafter referred to as "SFD") 102, a PHY header 103, and a payload (MAC data) 104.

When performing the distance estimation based on the frame 100, a reference is a first pulse of the PHY header 103 (hereinafter referred to as "RMARKER"), and a distance between two nodes is estimated based on the transmitting timing and receiving timing of RMARKER.

As shown in FIG. 2, when transmitting and receiving messages between two asynchronized nodes (node-A 10 and node-B 20), a two-way ranging (hereinafter referred to as "TWR") method uses a time of arrival (hereinafter referred to as "TOA") method to estimate a distance between two nodes.

The TOA is estimated based on a time when the TWR method includes RMARKER in a packet for measuring a distance and transmits it from the node-A 10 to the node-B 20, a time when it is received in the node-B 20, a time when it is transmitted from the node-B 20 to the node-A 10, and a time when it is received in the node-A 10. Herein, TOA($t_P$) may be obtained by the following Equation 1 using the TWR.

$$t_p = \frac{t_{roundA} - t_{replyB}}{2} \quad \text{[Equation 1]}$$

Herein, $t_{roundA}$ is from the time when the packet (RMARKER) is transmitted from the node-A 10 to the node-B 20 to the time when it is received back in the node-A 10. Further, $t_{replyB}$ is from the time when the packet (RMARKER) is received in the node-B 20 to the time when it is transmitted back from the node-B 20 to the node-A 10.

Next, a distance $d_{AB}$ between the node-A 10 and the node-B 20 can be obtained by the following Equation 2 based on TOA($t_P$).

$$d_{AB} = c \cdot t_p \quad \text{[Equation 2]}$$

Herein, c is the speed of light.

The TWR is affected by a clock frequency offset (hereinafter referred to as "CFO") at the time of estimating TOA. The TOA estimation error ($\hat{t}_p - t_p$) occurring by the effect of the CFO depends on the following Equation 3.

$$\hat{t}_p - t_p \approx \frac{1}{2} t_{replyB} \cdot (\varepsilon_A - \varepsilon_B) \quad \text{[Equation 3]}$$

Herein, $\varepsilon_A$, $\varepsilon_B$ represent the CFO of the node-A 10 and the node-B 20 in a ppm (parts-per-million) unit.

The TOA estimation error is affected by a difference value ($\varepsilon_A - \varepsilon_B$) in the CFO between the node-A 10 and the node-B 20 and a response time ($t_{replyB}$) at the node-B 20. At this time, when the difference value in the CFO is large, the response time is long and the TOA estimation error is thus increased.

Next, in the TWR method, a symmetric double-sided TWR (hereinafter referred to as "SDS-TWR") that is capable of solving problems affected by the CFO will be described with reference to FIG. 3.

Figure 3:
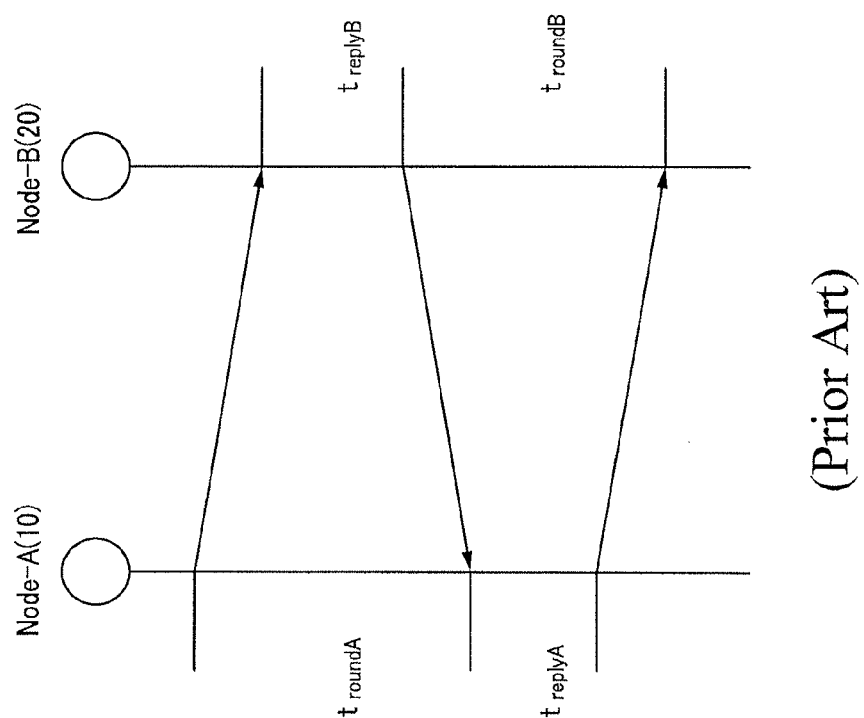
FIG. 3 is a diagram showing a symmetric double-sided two-way ranging method.

FIG. 3 is a diagram showing the symmetric double-sided TWR.

First, the SDS-TWR method obtains an average of the TOA estimated by the TWR method when initiation nodes are the node-A 10 and the node-B 20, respectively, that is, the initiation nodes are is different.

TOA($t_P$) may be obtained by the following Equation 4 using the SDS-TWR method.

$$t_p = \frac{(t_{roundA} - t_{replyA}) + (t_{roundB} - t_{replyB})}{4} \quad \text{[Equation 4]}$$

In the SDS-TWR method, when there is a CFO, the TOA estimation error ($\hat{t}_p - t_p$) depends on the following Equation 5.

$$\hat{t}_p - t_p \approx \frac{1}{4} \Delta_{reply} \cdot (\varepsilon_A - \varepsilon_B) \quad \text{[Equation 5]}$$

Herein, $\Delta_{reply}$ is $t_{replyB} - t_{replyA}$ and is a small value, such that it is less affected by the CFO.

Meanwhile, when the response time of the nodes, that is, the processing times of the received packet are different, $\Delta_{reply}$ becomes large and the accuracy of the resultant SDS- TWR becomes low. Further, the SDS-TWR method has a problem in transmitting and receiving many packets in order to reduce the effect of the CFO. When the positioning is performed based on the SDS-TWR method, a considerable load is applied to the network.

In the exemplary embodiment of the present invention, a method for accurately measuring a distance by estimating the clock frequency offset between the nodes in the asynchronous network is provided as follows.

The TWR method according to the first exemplary embodiment of the present invention will be described with reference to FIGS. 4 and 5.

Figure 4:
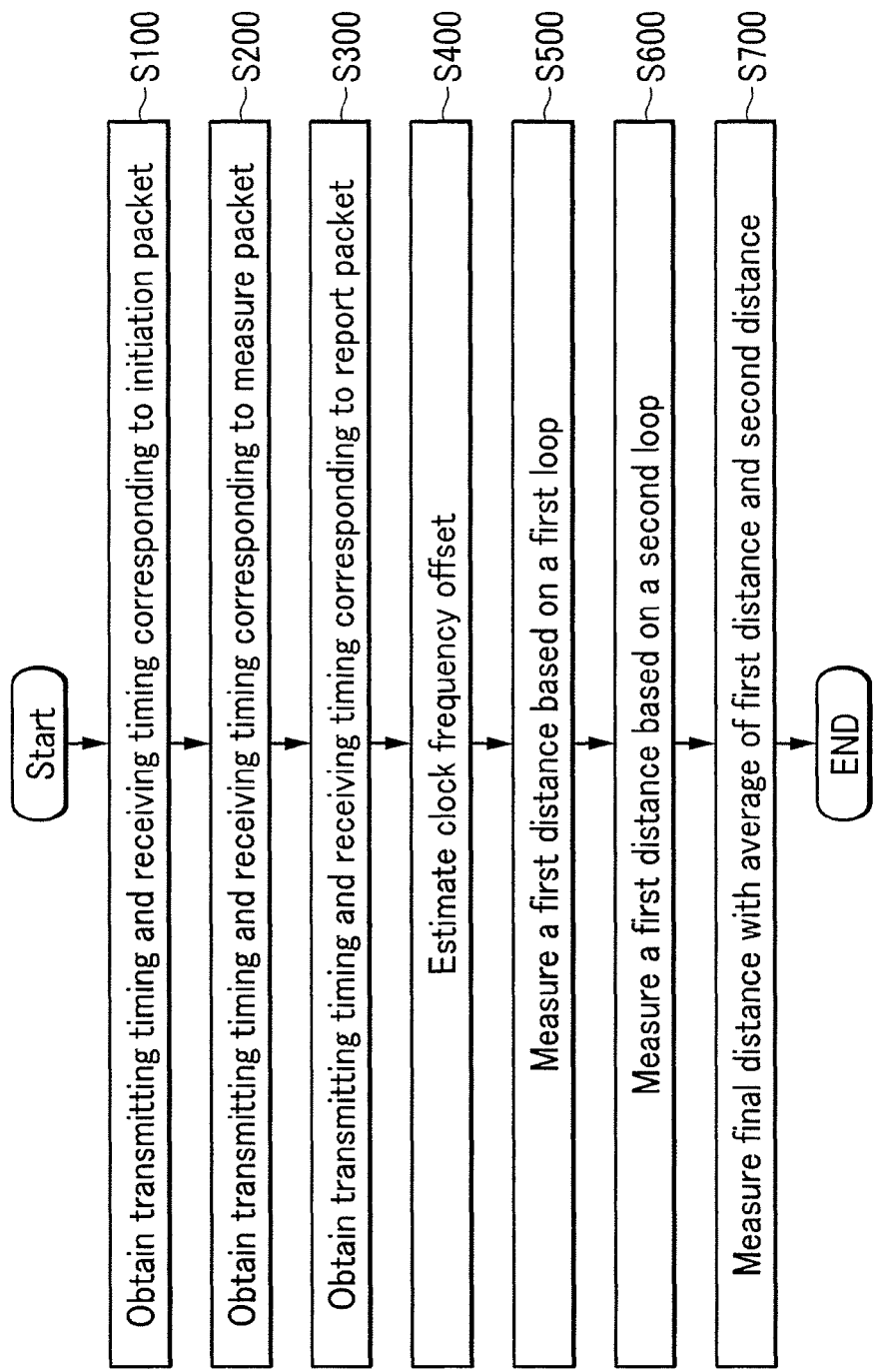
FIG. 4 is a flowchart showing a distance measuring method according to an exemplary embodiment of the present invention.
Figure 5:
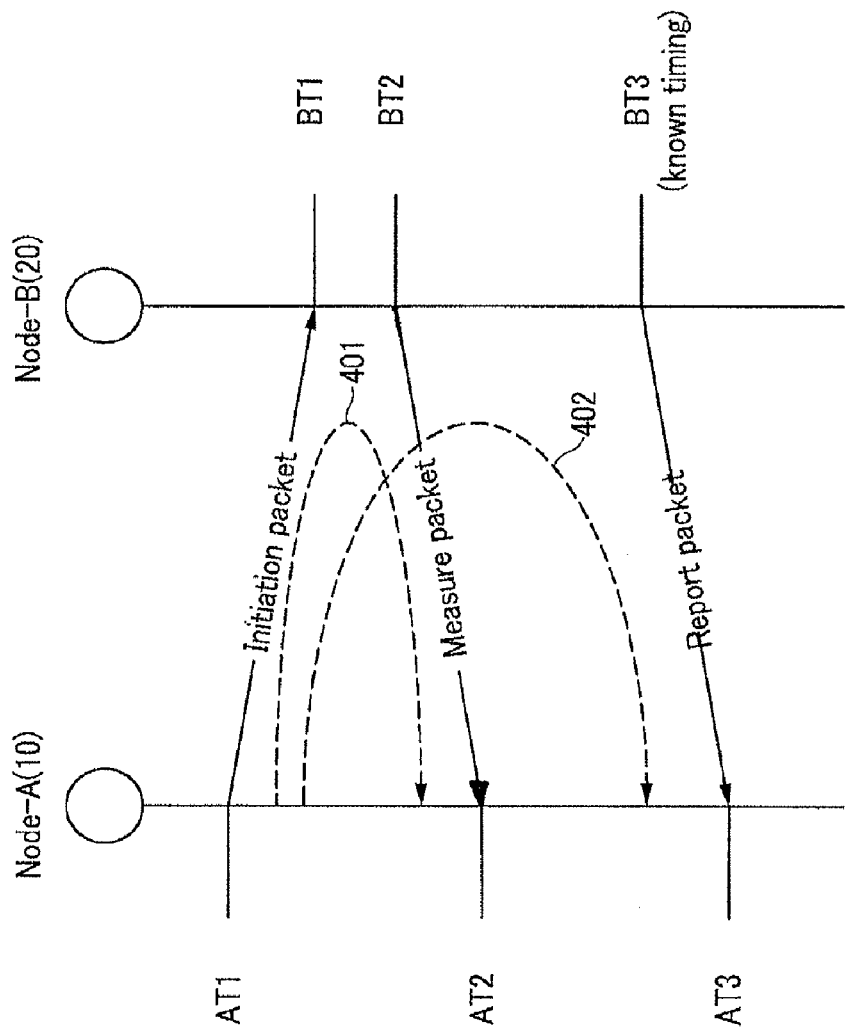
FIG. 5 is a diagram showing a TWR method according to a first exemplary embodiment of the present invention.

FIG. 4 shows a flowchart of a distance measuring method according to the exemplary embodiment of the present invention, and FIG. 5 is a diagram showing the TWR method according to the first exemplary embodiment of the present invention.

As shown in FIG. 4, the distance measuring method obtains timing for transmitting an initiation packet from the node-A 10 and timing for receiving the initiation packet from the node-B 20 (S100). Next, the distance measuring method obtains timing for transmitting a measure packet from the node-B 20 and timing for receiving the measure packet from the node-A 10 (S200). The distance measuring method obtains timing for transmitting a report packet from the node-B 20 and timing for receiving the report packet from the node-A 10 (S300).

In detail, as shown in FIG. 5, the node-A 10 transmits the initiation packet to the node-B 20 and the node-B 20 transmits the measure packet corresponding to the received initiation packet to the node-A 10. In addition, the measure packet is transmitted from the node-B 20, and after a predetermined time elapses, a report packet to inform time information (known timing) is transmitted to the node-A 10. Herein, the timings when the packet is transmitted and received between the node-A 10 and the node-B 20 are AT1, AT2, AT3, BT1, BT2, and BT3. In detail, AT1 is timing for transmitting the initiation packet from the node-A 10 to the node-B 20 and BT1 is timing for receiving the initiation packet in the node-B 20. BT2 is timing for transmitting the measuring packet from the node-B 20 to the node-A 10 and AT2 is timing for receiving the measure packet in the node-A 10. Further, BT3 is timing for transmitting the report packet from the node-B 20 to the node-A 10 and AT3 is timing for receiving the report packet in the node-A 10.

The TWR method according to the related art cannot carry and transmit the time of transmitting the packet on the report packet. In other words, since the TWR method according to the related art cannot use the BT3 and AT3, the TOA is estimated by Equation 1.

Meanwhile, the first exemplary embodiment of the present invention can carry and transmit the time of BT3 on the report packet from the node-B 20 to the node-A 10, such that the time of BT3 and AT3 can be used to calculate the TOA.

The report packet transmitting method obtains BT3 by counting the predetermined time from BT2 and summing the counted value and BT2. In other words, after previously defining the time position at which the report packet will be transmitted and configuring the packet, the counting is performed up to the corresponding time and the report packet is transmitted when the corresponding time is reached.

Next, in the first exemplary embodiment of the present invention, assume that each of the values of the CFO of the node-A 10 and the node-B 20 is $f_{oA}$, $f_{oB}$, and a frequency without the CFO is $f_c$. Then, TOA($t_p$) can be obtained by Equation 6.

$$t_p = \frac{t_{roundA} - t_{replyB}}{2} \quad \text{[Equation 6]}$$

$$t_{roundA} = (AT2 - AT1)\left(1 + \frac{f_{oA}}{f_c}\right)$$
$$:= (AT2 - AT1)(1 + \varepsilon_A)$$

$$t_{replyB} = (BT2 - BT1)\left(1 + \frac{f_{oB}}{f_c}\right)$$
$$:= (BT2 - BT1)(1 + \varepsilon_B)$$

Herein, $\varepsilon_A$ is $\varepsilon_A = f_{oA}/f_c$ and $\varepsilon_B$ is $\varepsilon_B = f_{oB}/f_c$.

In the TOA estimating method according to Equation 6, the effect of an absolute CFO value of each node itself is insignificant. For example, when the CFO in the node-A 10, $\delta_A = 10 \times 10^{-6}$, and when the CFO in the node-B 20, $\delta_B = 10 \times 10^{-6}$, assume that the TOA is estimated. Herein, if AT2−AT1=100005 nsec and BT2−BT1=100000 nsec, then AT2'−AT1'=100006 nsec and BT2'−BT1'=99999 nsec when there is the CFO. At this time, an actual TOA($t_p$) is 5 nsec/2, while the estimated TOA($t_p$') is 7 nsec/2. As another example, assume that when in the node-A 10 and the node-B 20, $\delta_A = \delta_B = 10 \times 10^{-6}$, the TOA is estimated. It can be appreciated that when AT2'−AT1'=100006 nsec and BT2'−BT1'=100001 nsec, the estimated TOA is 5 nec/2, and when there is no CFO, it is the same as the estimated value. In other words, the absolute CFO value of the node itself is not significant but the difference between the relative CFO values of each node is significant.

Next, assume that the CFO does not exist in the node-A 10 and the CFO exists in the node-B 20.

As shown in FIG. 5, since the report packet including the time of BT3 is transmitted from the node-B 20 to the node-A 10, the node-A 10 can use the BT3 and AT3 to estimate the TOA.

The distance measuring method estimates the CFO (S400), and measures the first distance based on the CFO and timings for transmitting and receiving the obtained initiation packet and measure packet (S500). Herein, the first distance is a distance measured based on a first loop 401.

Further, the second distance is measured based on the CFO and timings for transmitting and receiving the obtained initiation packet and report packet (S500). Herein, the second distance is a distance measured based on a second loop 402 (S600).

In detail, the TOA can be obtained by Equation 7 based on the first loop 401 and the second loop 402.

$$2t_{p,1} = (AT2 - AT1) - (BT2 - BT1)(1 + \delta_B)$$
$$2t_{p,2} = (AT3 - AT1) - (BT3 - BT1)(1 + \delta_B) \quad \text{[Equation 7]}$$

Herein, since $t_{p,1} = t_{p,2}$ should be satisfied, the CFO can be obtained by Equation 8.

$$\delta_B = \frac{AT3 - AT2}{BT3 - BT2} - 1 \quad \text{[Equation 8]}$$

The distance measuring method can obtain the final distance of the node-A 10 and the node-B 20 according to Equation 9 based on the measured first distance and second distance (S700). In detail, when estimating the CFO by Equation 8, the average TOA can be obtained by Equation 9 based on two TOA calculating equations represented by Equation 7.

$$\hat{t}_p = (t_{p,1} + t_{p,2})/2 \quad \text{[Equation 9]}$$

Through this process, the distance between the node-A 10 and the node-B 20 can be measured. The TWR method according to the first exemplary embodiment of the present invention is a backward report method, since the node-B 20 transmits the report packet. The TWR method can be changed in various forms.

Next, a TWR method according to a second exemplary embodiment of the present invention will be described with reference to FIG. 6.

Figure 6:
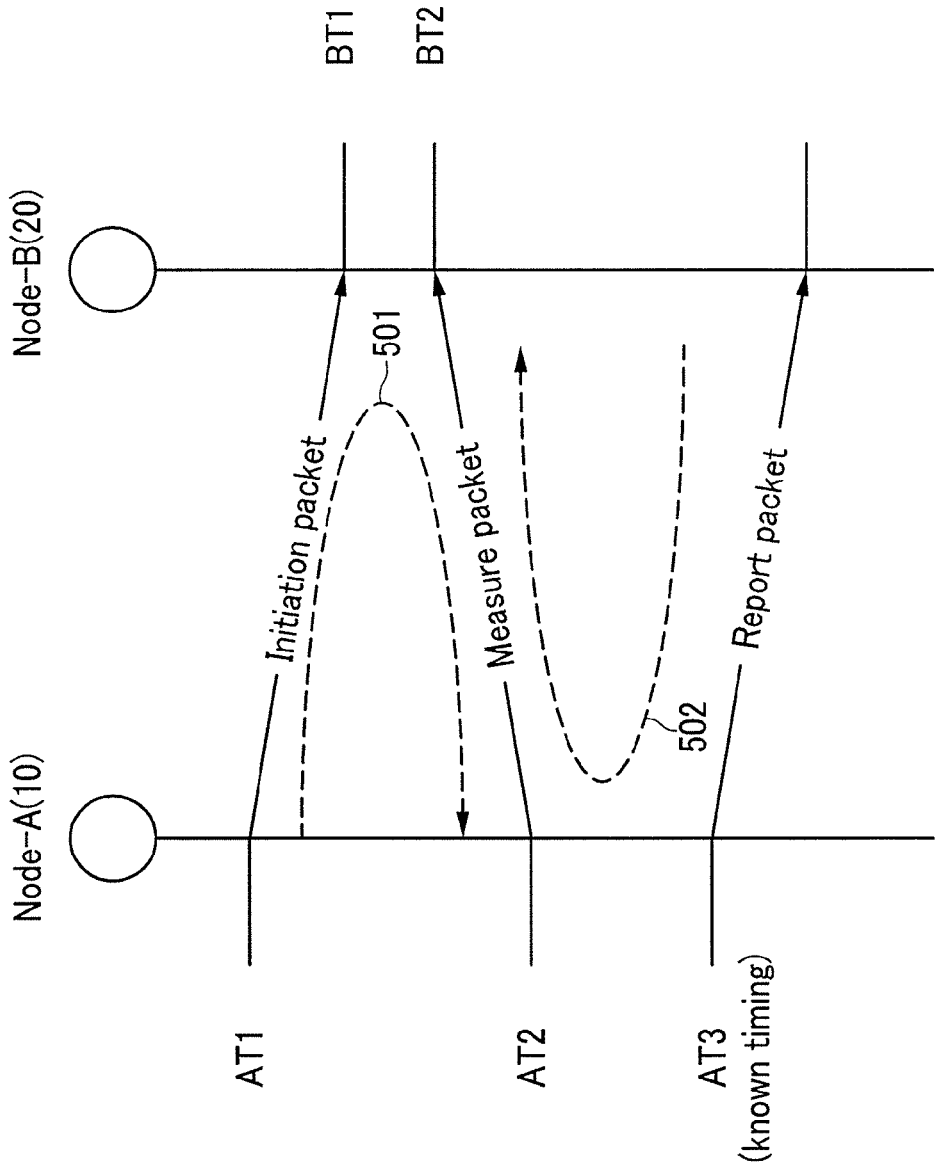
FIG. 6 is a diagram showing a TWR method according to a second exemplary embodiment of the present invention.

FIG. 6 is a diagram showing a TWR method according to a second exemplary embodiment of the present invention.

As shown in FIG. 6, the node-A 10 transmits the initiation packet to the node-B 20 and the node-B 20 transmits the measure packet to the node-A 10. Further, the node-A 10 receives the measure packet and after the predetermined time elapses, the report packet is transmitted to the node-B 20. Unlike the above first exemplary embodiment, the node-A 10 to measure the distance receives the measure packet and then transmits the report packet to the node-B 20.

Next, the TOA can be obtained by Equation 10 based on a third loop 501 and a fourth loop 502.

$$2t_{p,1}=(AT2-AT1)-(BT2-BT1)(1+\delta_B)$$

$$2t_{p,2}=(BT2-BT3)-(AT2-AT3)(1+\delta_B) \quad \text{[Equation 10]}$$

In addition, the average TOA can be obtained by Equation 9 based on two TOA calculating equations represented by Equation 10 by estimating the CFO. The AT1, AT2, BT1, and BT2 used herein are the same as in the first exemplary embodiment, and the BT3 is timing for transmitting the report packet from the node-A 10 to the node-B 20 and the AT3 is timing for receiving the report packet in the node-B 20.

The process can be implemented based on the above first exemplary embodiment, and therefore the detailed description thereof will be omitted herein.

A TWR method according to a third exemplary embodiment of the present invention is a forward report method, since the node-A transmits the report packet. However, it is not limited to the TWR method.

Next, the TWR method according to the third exemplary embodiment of the present invention will be described in detail with reference to FIG. 7.

Figure 7:
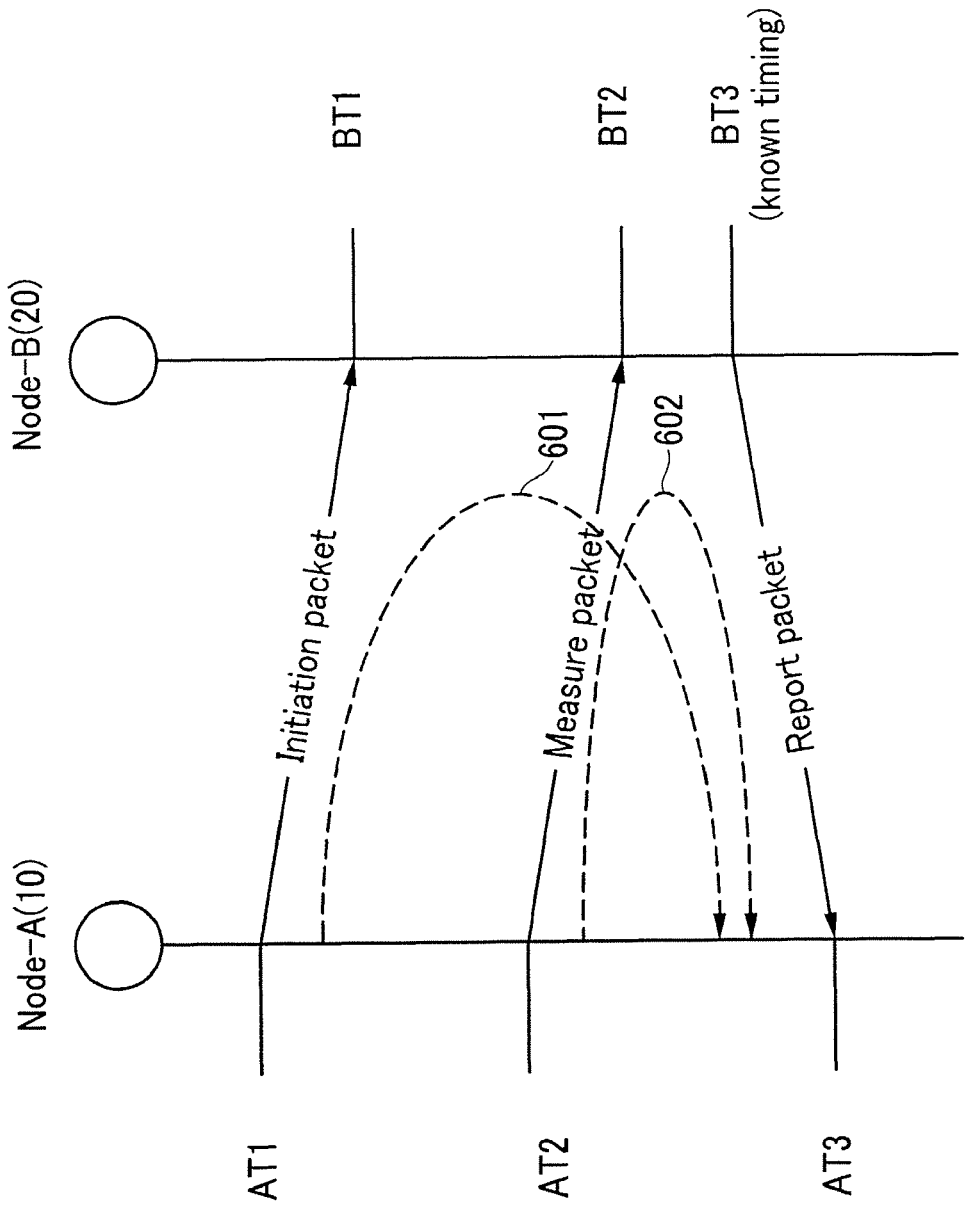
FIG. 7 is a diagram showing a TWR method according to a third exemplary embodiment of the present invention.

FIG. 7 is a diagram showing the TWR method according to the third exemplary embodiment of the present invention.

As shown in FIG. 7, the node-A 10 transmits the initiation packet to the node-B 20. Further, the node-A 10 transmits the initiation packet and then transmits the measure packet to the node-B 20, and the node-B 20 receives the measure packet and after the predetermined time elapses, transmits the report packet to the node-A 10. In other words, unlike the first and second exemplary embodiments, in the third exemplary embodiment of the present invention, the node-A 10 to measure a distance transmits the initiation packet and then transmits the measure packet to the node-B 20.

At this time, the TOA can be obtained by Equation 11 based on a fifth loop 601 and a sixth loop 602

$$2t_{p,1}=(AT3-AT1)-(BT3-BT1)(1+\delta_B)$$

$$2t_{p,2}=(AT3-AT2)-(BT3-BT2)(1+\delta_B) \quad \text{[Equation 11]}$$

In addition, the average TOA can be obtained by Equation 9 based on two TOA calculating equations represented by Equation 11 by estimating the CFO. The AT1, AT3, BT1, and BT3 used herein are the same as in the first exemplary embodiment, and the AT2 is timing for transmitting the measure packet from the node-A 10 to the node-B 20 and the BT2 is timing for receiving the measure packet in the node-B 20.

The process can be implemented based on the above first exemplary embodiment, and therefore the detailed description thereof will be omitted herein.

Therefore, the TWR method according to the first, second, and third exemplary embodiments performs TOA calculation by the average method like the SDS-TWR method, such that it is much better than the TWR method according to the related art.

Next, in the TWR method according to the exemplary embodiments of the present invention, mean square error performance of the distance estimation will be described in detail with reference to FIG. 8.

Figure 8:
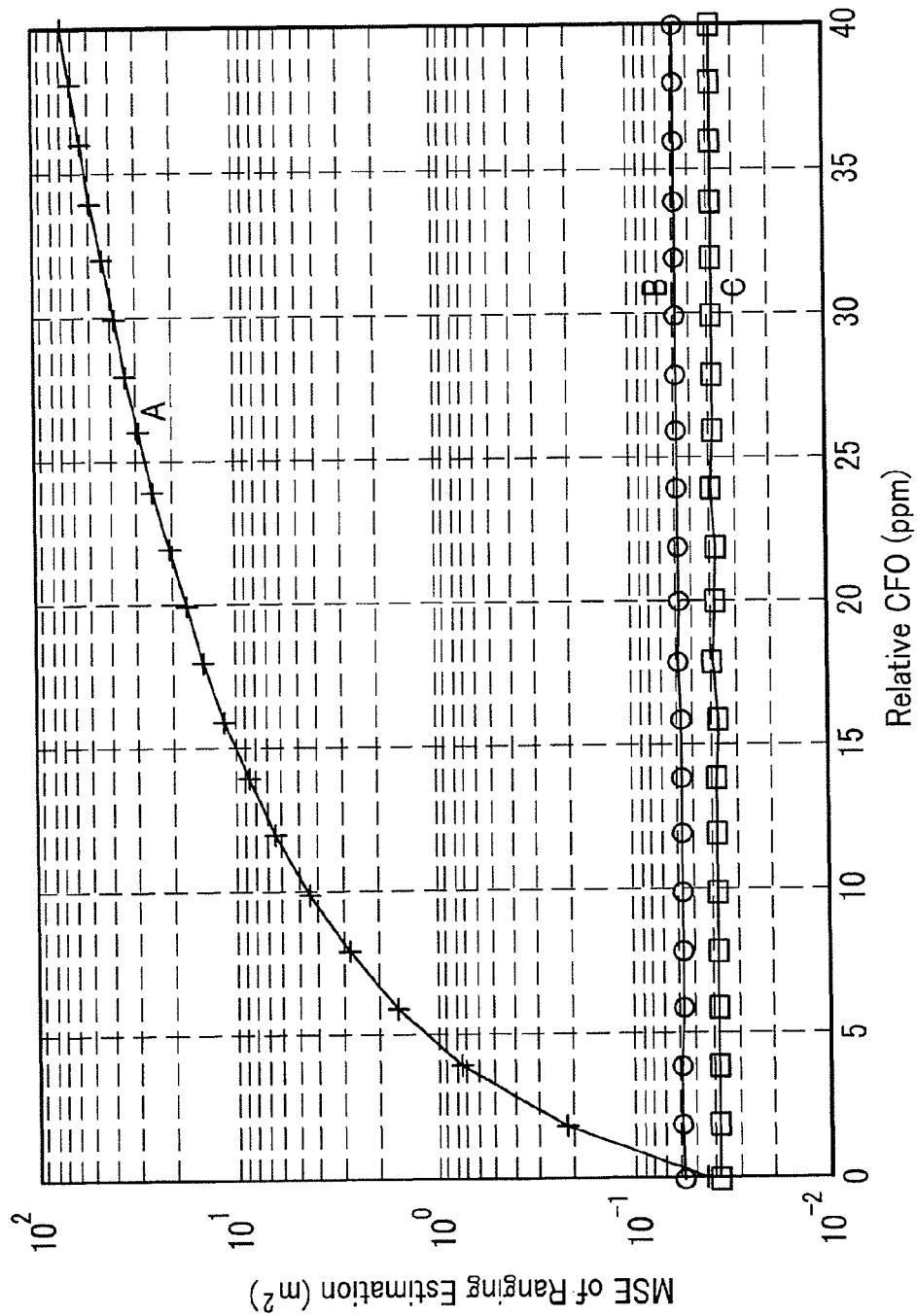
FIG. 8 is a diagram showing mean square error performance of distance estimation of the TWR method according to the exemplary embodiments of the present invention.

FIG. 8 is a diagram showing mean square error performance of distance estimation of the TWR method according to the exemplary embodiments of the present invention.

First, the mean square error (MSE) of the distance estimation according to the TWR method is shown according to the CFO value to show the mean square error performance.

When the distance is estimated by applying the TWR method according to the related art, as the value of the CFO value is increased, the distance estimation error is increased as shown by a line A of FIG. 8.

On the other hand, when the distance is estimated by applying the backward report method that is the TWR method according to the first exemplary embodiment of the present invention, the distance estimation error is always constant as shown by a line B of FIG. 8. Further, when the distance is estimated by applying the forward report method that is the TWR method according to the second exemplary embodiment of the present invention, the distance estimation error is always constant as shown by a line C FIG. 8.

Next, a position measuring method according to an exemplary embodiment of the present invention based on the foregoing distance measuring method will be described.

The position measuring method according to an exemplary embodiment of the present invention measures the position of the predetermined node based on the timings for transmitting and receiving the initiation packet, the measure packet, and the report packet, like the foregoing distance measuring method.

First, the position measuring method according to the fourth exemplary embodiment of the present invention will be described in detail with reference to FIG. 9.

In the fourth exemplary embodiment of the present invention, the node whose position should be measured is a mobile node, and the position of the mobile node is measured based on the transmitting and receiving timings obtained by transmitting and receiving the plurality of packets between the corresponding mobile node and the plurality of nodes that are references for measuring the position as described in the foregoing first to third embodiments.

Figure 9:
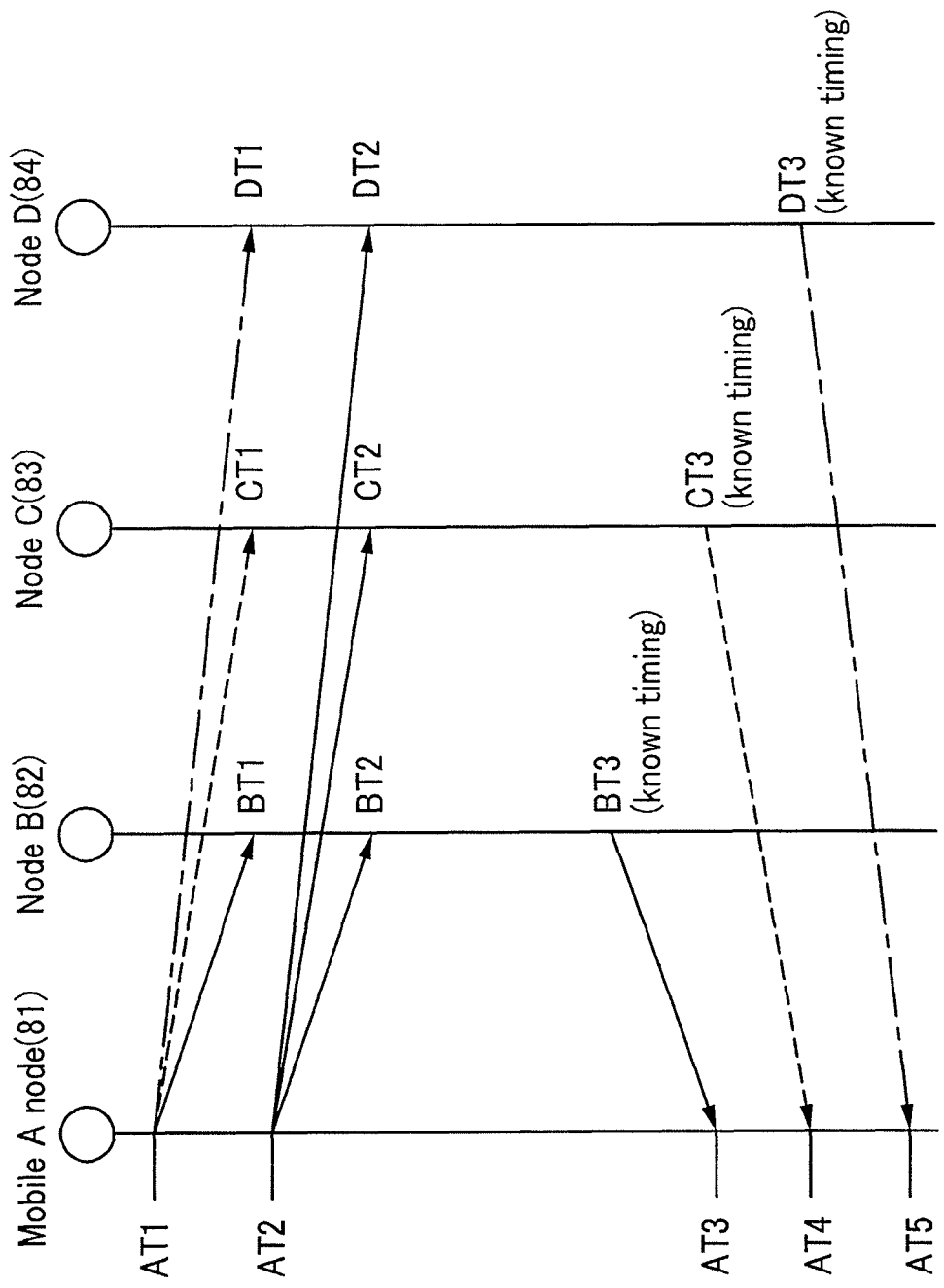
FIG. 9 is a diagram showing a position measuring method according to a fourth exemplary embodiment of the present invention.

FIG. 9 is a diagram showing a position measuring method according to the fourth exemplary embodiment of the present invention.

With the TWR method according to the fourth exemplary embodiment of the present invention, the position measurement is performed based on timings obtained by transmitting and receiving packets between a mobile A node 81 that is a measure node, and nodes B, C, and D 82, 83, and 84 that are reference nodes.

The mobile A node 81 corresponds to the measure node to estimate the position, and the measure node transmits and receives packets in a form of broadcasting the packets through the reference nodes and wireless. At this time, when the broadcasting transmits the packets, it includes a structure of setting and transmitting a specific node and a structure of transmitting without a defined node. Further, the reference nodes B, C and D 82, 83, and 84 can previously calculate the position. At this time, the network of the reference nodes is previously configured through both wired and wireless.

As shown in FIG. 9, the mobile A node 81 first broadcasts the initiation packet, which is the first packet, to the reference nodes 82, 83, and 84, respectively. The first packet transmission process is performed, and after the predetermined time elapses, the mobile A node 81 broadcasts the measure packets to the reference nodes 82, 83, and 84, respectively, and each of the reference nodes 82, 83, and 84 transmits the report packet to the mobile A node 81.

In addition, the position measuring method according to the exemplary embodiment of the present invention is not shown in FIG. 9, but the initiation packet is broadcast from the mobile A node to each of the reference nodes, and each of the reference nodes transmits the measure packet to the mobile A node according to a predetermined order such that the mobile A node can receive each measure packet and then transmit each report packet to the reference nodes. However, the method is not limited thereto.

The number of packets used at the time of performing the positioning according to the related art is proportional to the number of packets and the number of reference nodes transmitted and received to estimate the distance between the nodes. For example, assume that there are three mobile A nodes and reference nodes. At this time, when the distance is estimated based on the SDS-TWR method, the number of packets transmitted and received from and to each reference node is four, and thus the packets should be transmitted and received twelve times in total to perform the positioning once.

When one mobile node performs the positioning together with three reference nodes based on the TWR method according to the fourth exemplary embodiment of the present invention, the packets are transmitted and received five times in total to perform the positioning once. In other words, the TWR method according to the third exemplary embodiment of the present invention has a remarkably reduced network load as compared to the related art.

The positioning method according to the fourth exemplary embodiment of the present invention uses the broadcast function of packets when transmitting and receiving the packets, but is not limited thereto. In detail, the mobile A node 81 broadcasts the initiation packet to the reference nodes 82, 83, and 84, and each of the reference nodes 82, 83, and 84 broadcasts the report packet to the mobile A node 81 in a predefined order. Herein, the order of transmitting the report packets by the reference nodes 82, 83, and 84 is designated in the initiation packet, and then these packets are transmitted. In addition, the information on the packet transmitting/receiving timing is transmitted when transmitting the report packets from each reference node.

Further, the mobile A node 81 transmits and receives packet number 5, that is, exchanges the packets to estimate a distance between the mobile A node 81 and the node B, a distance between the mobile A node 81 and the node C 83, and a distance between the mobile A node 81 and the node D 84 from the time information of AT1, AT2, AT3, BT1, BT2, and BT3, AT1, AT2, AT4, CT1, CT2, and CT3, and AT1, AT2, AT5, DT1, DT2, and DT3, respectively, and the positioning is performed based on the estimated distance.

Next, a position measuring method according to a fifth exemplary embodiment of the present invention will be described in detail with reference to FIG. 10.

Figure 10:
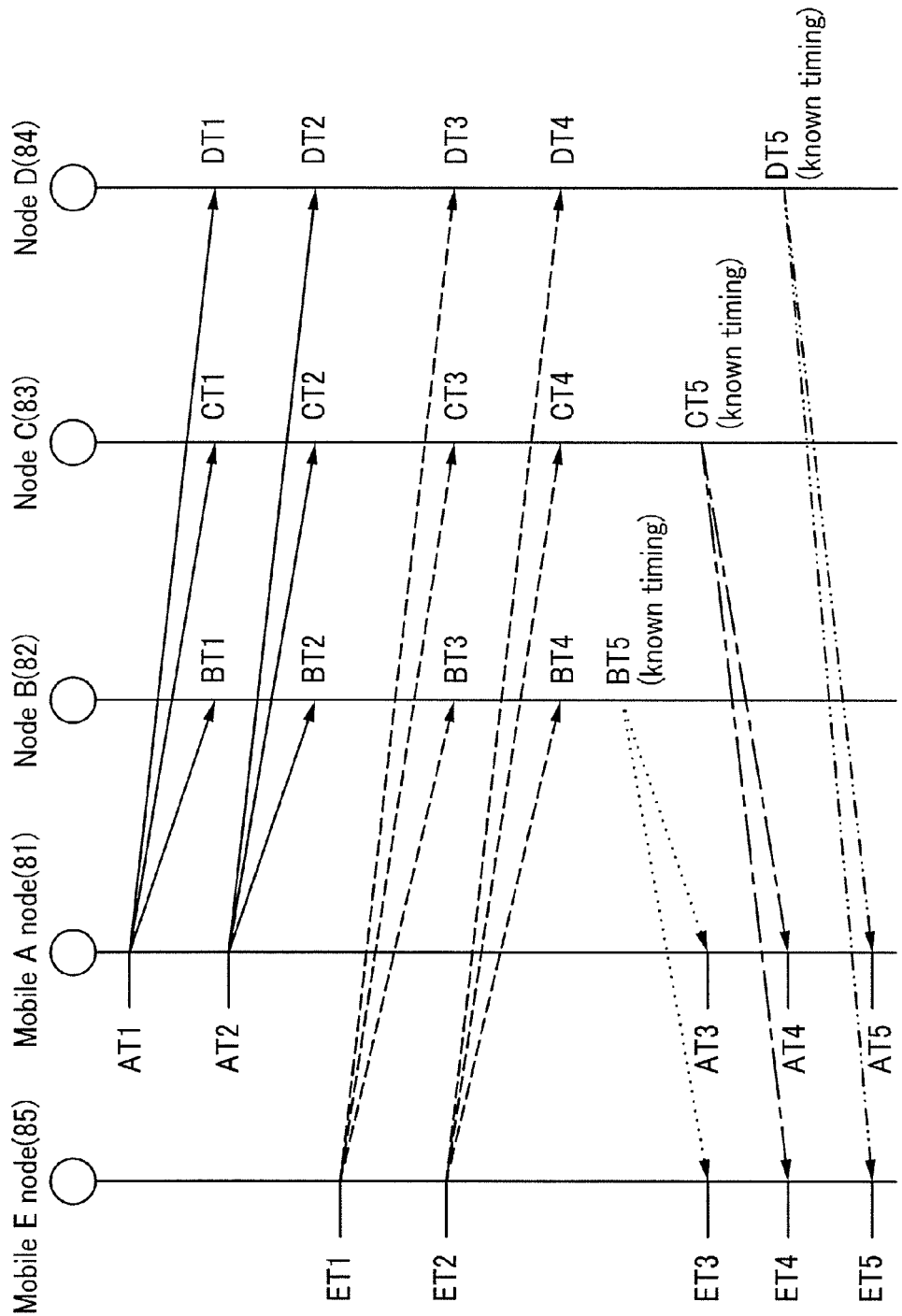
FIG. 10 is diagram showing a position measuring method according to a fifth exemplary embodiment of the present invention.

FIG. 10 is diagram showing a position measuring method according to a fifth exemplary embodiment of the present invention.

The position measure method according to the fifth exemplary embodiment of the present invention corresponds to a case where there are two mobile nodes that are measure nodes to measure the position. Herein, the mobile node is the mobile A node 81 and a mobile E node 85.

Each mobile node transmits the packet twice, and each reference node transmits the report packet including the time information to each mobile node. In other words, when there are two mobile nodes, a total of seven packets are transmitted and received to perform the positioning once.

With the exemplary embodiment of the present invention, when performing the positioning in the environment where there are N mobile nodes and M reference nodes, the number of necessary packet transmissions is N×2+M. Meanwhile, when using the SDS-TWR method, the number of necessary packet transmissions is N×M×4 when performing the positioning.

Next, in order to perform the positioning, the packet transmission process between the mobile nodes (mobile A node, mobile E node) and the reference nodes will be described.

As shown in FIG. 10, in the position measuring method according to the exemplary embodiment of the present invention, the mobile A node transmits the initiation packet and the measure packet to the reference nodes and the mobile E node, then transmits the initiation packet and the measure packet to the reference nodes, and the reference nodes receive all the initiation packet and the measure packet of the mobile nodes and then broadcasts the report packet to the mobile nodes.

Further, in the position measuring method according to the exemplary embodiment of the present invention, although not shown in FIG. 10, each of the mobile nodes 81 and 85 broadcasts the initiation packet to the reference nodes 82, 83, and 84, respectively. Next, each of the mobile nodes 81 and 85 completes all the transmission of the initiation packets and then broadcasts the measure packets to the reference nodes 82, 83, and 84. Next, each of the mobile nodes 81 and 85 receives all the initiation packets and the measure packets from the reference nodes 82, 83, and 84, then broadcasts the report packets to the mobile nodes 81 and 85, respectively.

Meanwhile, when receiving packets, each node may count them in synchronization with a clock at portions of an end of a preamble, a start or end of a specific marker, or a start or end of a header, or store them at the corresponding position.

With the exemplary embodiments of the present invention, the distance between the nodes can be more precisely estimated by estimating the clock frequency offset between the nodes in the synchronous network. Further, in the exemplary embodiments of the present invention, the number of packets transmitted and received between the nodes is reduced by more precisely estimating the distance than at the time of measuring the position, making it possible to reduce the load of the network.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer-implemented method for measuring distance based on packets transmitted and received between a first node and a second node, comprising:
   obtaining first timing for transmitting a first packet from the first node;
   obtaining second timing for receiving the first packet in the second node;
   obtaining third timing for transmitting a second packet corresponding to the first packet from the second node;
   obtaining fourth timing for receiving the second packet in the first node;
   obtaining fifth timing for transmitting a third packet from the second node;
   obtaining sixth timing for receiving the third packet in the first node;
   estimating a clock frequency offset based on the obtained timings;
   measuring a first distance based on the clock frequency offset and timings for transmitting and receiving the first packet and the second packet;
   measuring a second distance based on the clock frequency offset and timings for transmitting and receiving the first packet and the third packet; and
   measuring by a micro-processor a distance between the first node and the second node based on the first distance and the second distance.

2. The computer implemented method of claim 1, wherein each of the nodes generates a packet by including at least one of IDs of at least one of receivers, information on a response order of the receivers, information on timing for transmitting a packet from the receivers, information on timing for receiving previously received a packet, and timing for transmitting the transmitted packet.

3. The computer implemented method of claim 2, wherein each of the packets is transmitted at any time or is transmitted at a specific time included in the packet.

4. The computer implemented method of claim 1, further comprising when receiving the first packet, the second packet, and the third packet, a corresponding node counts them in synchronization with a clock at portions of an end of a preamble, a start or end of a specific marker, or a start or end of a header, or stores them at a corresponding position.

5. The computer implemented method of claim 1, wherein the fifth timing is any one of timing corresponding to a defined interval between nodes from the third timing and fourth timing of the second packet, timing corresponding to a time interval included in the first packet or the second packet, and timing included in the third packet itself.

6. The computer implemented method of claim 1, wherein the estimating the clock frequency offset includes dividing a difference value between the sixth timing and the fourth timing by a difference value between the fifth timing and the third timing, and measuring a difference between the divided resulting value and a predetermined value.

7. The computer implemented method of claim 1, wherein the measuring the first distance includes measuring the first distance based on a difference value between the fourth timing and the first timing, a difference value between the third timing and the second timing, and the clock frequency offset.

8. The computer implemented method of claim 1, wherein the measuring the second distance includes measuring the second distance based on a difference value between the sixth timing and the first timing, a difference value between the fifth timing and the second timing, and the clock frequency offset.

9. The computer implemented method of claim 1, further comprising:
   measuring distances between the first node and a plurality of reference nodes, respectively, when the first node is configured of a measuring node measuring a position and the second node is configured of the plurality of reference nodes that are capable of previously calculating a position; and
   measuring the position of the measuring node based on the measured distances.

10. A computer-implemented method for measuring distance based on packets transmitted and received between a first node and a second node, comprising:
    obtaining first timing for transmitting a first packet from the first node;
    obtaining second timing for receiving the first packet in the second node;
    obtaining third timing for transmitting a second packet corresponding to the first packet from the second node;
    obtaining fourth timing for receiving the second packet in the first node;
    obtaining fifth timing for transmitting a third packet from the first node;
    obtaining sixth timing for receiving the third packet in the second node;
    estimating a clock frequency offset based on the obtained timings;
    measuring a first distance based on the clock frequency offset and timings for transmitting and receiving the first packet and the second packet;
    measuring a second distance based on the clock frequency offset and timings for transmitting and receiving the second packet and the third packet; and
    measuring by a micro-processor a distance between the first node and the second node based on the first distance and the second distance.

11. The computer implemented method of claim 10, wherein the measuring the first distance includes measuring the first distance based on a difference value between the fourth timing and the first timing, a difference value between the third timing and the second timing, and the clock frequency offset.

12. The computer implemented method of claim 10, wherein the measuring the second distance includes measuring the second distance based on a difference value between the third timing and the sixth timing, a difference value between the fourth timing and the first timing, and the clock frequency offset.

13. A computer-implemented method for measuring distance based on packets transmitted and received between a first node and a second node, comprising:
    obtaining first timing for transmitting a first packet from the first node;
    obtaining second timing for receiving the first packet in the second node;
    obtaining third timing for transmitting a second packet corresponding to the first packet from the second node;
    obtaining fourth timing for receiving the second packet in the second node;
    obtaining fifth timing for transmitting a third packet from the second node;
    obtaining sixth timing for receiving the third packet in the first node;
    estimating a clock frequency offset based on the obtained timings;

measuring a first distance based on the clock frequency offset and timings for transmitting and receiving the first packet and the third packet;

measuring a second distance based on the clock frequency offset and timings for transmitting and receiving the second packet and the third packet; and measuring by a micro-processor a distance between the first node and the second node based on the first distance and the second distance.

14. The computer implemented method of claim 13, wherein the estimating the clock frequency offset includes dividing a difference value between the third timing and the first timing by a difference value between the fourth timing and the second timing, and measuring a difference between the divided resulting value and a specific value.

15. The computer implemented method of claim 13, wherein the measuring the first distance includes measuring the first distance based on a difference value between the sixth timing and the first timing, a difference value between the fifth timing and the second timing, and the clock frequency offset.

16. The computer implemented method of claim 13, wherein the measuring the second distance includes measuring the second distance based on a difference value between the sixth timing and the third timing, a difference value between the fifth timing and the fourth timing, and the clock frequency offset.

* * * * *